United States Patent [19]

Meal et al.

[11] 4,333,213
[45] Jun. 8, 1982

[54] APPARATUS FOR BONDING LEADS TO CAPACITOR BLANKS

[75] Inventors: John R. Meal, Naperville; Donald K. Sandmore, Oak Lawn, both of Ill.

[73] Assignee: Western Electric Company, Inc., New York, N.Y.

[21] Appl. No.: 225,579

[22] Filed: Jan. 16, 1981

Related U.S. Application Data

[62] Division of Ser. No. 72,394, Sep. 4, 1979, Pat. No. 4,268,942.

[51] Int. Cl.³ .............................................. H01G 4/32
[52] U.S. Cl. .................................. 29/25.42; 29/564.6; 29/856; 219/56.22; 219/78.16; 228/5.1; 228/6 A; 228/180 R
[58] Field of Search ...................... 29/25.42, 619, 621, 29/564.1, 564.6, 854, 855, 856, 879; 228/5.1, 6 A, 179, 180 R; 219/56.22, 78.16

[56] References Cited

U.S. PATENT DOCUMENTS

| | | | |
|---|---|---|---|
| 3,101,868 | 8/1963 | Glaubke | 221/225 |
| 3,263,305 | 8/1966 | Butler et al. | 29/621 |
| 3,457,477 | 7/1969 | Iwaya et al. | 29/25.42 |
| 3,641,649 | 2/1972 | Busler et al. | 29/564.6 |
| 4,003,125 | 1/1977 | Wallick | 29/569 R |
| 4,012,835 | 3/1977 | Wallick | 29/591 |
| 4,054,238 | 10/1977 | Lloyd et al. | 228/173 |
| 4,155,156 | 5/1979 | Assmann et al. | 228/179 |
| 4,214,353 | 7/1980 | Kalina | 29/25.42 |

Primary Examiner—Carl E. Hall
Assistant Examiner—P. W. Echols
Attorney, Agent, or Firm—R. P. Miller

[57] ABSTRACT

A boxed and encapsulated rolled metallized film capacitor susceptible to facile machine insertion is fabricated by cyclically advancing a lead frame 32 through a number of stations (36,37) whereat pairs of leads (24,26) of the lead frame are bent downwardly and secured to end electrodes (22,23) formed on the capacitors, and then boxes (29) partially filled with encapsulant are moved over each capacitor secured to a pair of leads. Next, the lead frame is advanced to move each box and capacitor into position to receive additional encapsulant from a nozzle (38) which is projected through a feed hole (34) formed in the lead frame.

7 Claims, 12 Drawing Figures

FIG. 5

APPARATUS FOR BONDING LEADS TO CAPACITOR BLANKS

This is a division of application Ser. No. 072,394 filed Sept. 4, 1979, now U.S. Pat. No. 4,268,942.

TECHNICAL FIELD OF THE INVENTION

This invention relates to methods and apparatus for assembling boxed encapsulated capacitors or other small electrical devices, and more particularly to the assembly and encapsulation of boxed capacitors of the type that are readily machine insertable in a printed circuit board or other circuit support.

BACKGROUND OF THE INVENTION

In the present day mass production of smaller and smaller printed circuit assemblies, there is a continued need for new and improved methods and apparatus for packaging electrical devices which can be readily machine inserted into or onto printed circuit boards or other circuit structures.

A number of diverse types of electrical devices have been packaged in small plastic housings with parallel electrical leads extending therefrom, and these packaged devices have been termed DIP's (Dual In-Line Packages). These DIP's are usually mass assembled by advancing a pair of lead frames or strips through one or more assembly stations whereat leads extending from the strips are bonded to passive or active electrical devices which may be housed in small dielectric plastic boxes.

One such assembly method is disclosed in copending application Ser. No. 974,152 filed Dec. 28, 1978, in the name of R. F. Kalina, now U.S. Pat. No. 4,214,303, wherein leads projecting from a spaced pair of carrier strips are heated and forced through opposed walls of a plastic box. Next, a rolled metallized film capacitor blank is moved within the box to deflect the leads against heat fusible end electrodes formed on the capacitor blank. Additional heat is applied to fuse the leads to the end electrodes whereafter the leads are severed from the carrier strips to provide discrete packaged capacitors which may be readily assembled to printed circuit boards.

Other examples of methods and apparatus for assembling dual in-line packages are illustrated in U.S. Pat. Nos. 4,003,125 and 4,012,835 both issued to C. W. Wallick, wherein small boxed circuit modules are terminated by advancing opposed blanks of lead frames of terminals toward and onto metallized pads formed along opposed outer sides of semi-conductor modules. The terminals are then soldered to the pads to interconnect the terminals with the circuit elements of the module. In general, dual in-line packages of this type are ultimately assembled with the leads extending through a circuit board so that the projecting portions of the leads may be wave soldered to circuit paths formed on the underside of the board.

Other electrical devices, such as coil bobbins, have been assembled with terminals by using the lead frame technique. U.S. Pat. No. 3,641,649 issued Feb. 15, 1972, to Busler et al. shows an assembly method wherein a continuous strip of groups of terminals interconnected by supporting sections is cyclically fed to advance each group of terminals into a flange of a coil bobbin, whereupon the terminals are bent and secured. Next, the supporting sections of the terminal strips are severed, leaving the terminals projecting from the bobbin flange.

In copending application Ser. No. 974,182, filed Dec. 28, 1978, in the names of W. J. Fanning and O. T. Masopust, Jr., now U.S. Pat. No. 4,240,127, there is disclosed a small metallized film capacitor which may be packaged in accordance with the present invention to provide a DIP type device that may be readily machine inserted in a printed circuit board or other circuit support.

SUMMARY OF THE INVENTION

This invention contemplates, among other things, methods and apparatus for assembling electrical devices, such as rolled metallized film capacitors, on pairs of leads depending from a lead frame, and then placing small boxes partially filled with encapsulant about each of the devices whereafter additional encapsulant is metered into the boxes to completely encapsulate each device.

More particularly, a lead frame having pairs of oppositely extending leads projecting from a central strip, and having feed holes formed in the strip between each pair of leads, is cyclically advanced through a first assembly station whereat capacitor blanks having heat fusible end electrodes are moved into proximity of the lead frame. At this station the leads are bent downwardly into engagement with and held against the end electrodes, whereupon bonding facilities are rendered effective to fuse the end electrodes to the engaged leads. Next, the cyclically advanced lead frame moves each bonded capacitor into a second station where a box partially filled with encapsulant is lifted into a position about the capacitor so that the encapsulant partially submerges the capacitor.

Subsequent advance of the lead frame moves the boxed capacitor into a final encapsulant filling station where a nozzle is moved through a feed hole in the lead frame to direct additional encapsulant into the boxed capacitor. Thereafter, the boxed capacitors may be advanced into carrier racks for subsequent transport to a curing oven to set the encapsulant, or the boxed capacitors may be advanced directly through a curing oven to set the encapsulant.

BRIEF DESCRIPTION OF THE DRAWINGS

Other features and advantages of the present invention will be apparent upon consideration of the detailed description in conjunction with the drawing, wherein.

DETAILED DESCRIPTION

Figure 1:
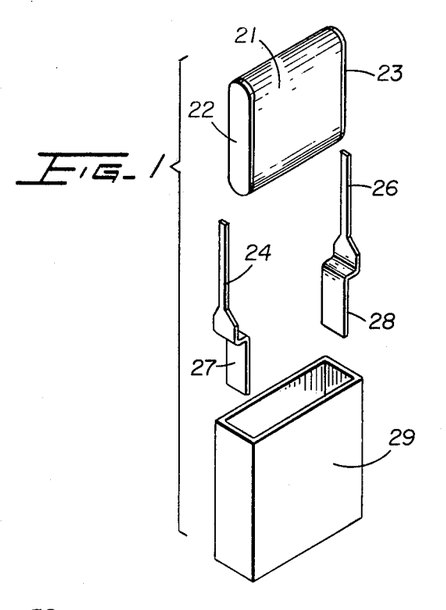
FIG. 1 is an exploded perspective view of the elements of a boxed capacitor which is assembled by the method and apparatus of the present invention.
Figure 2:
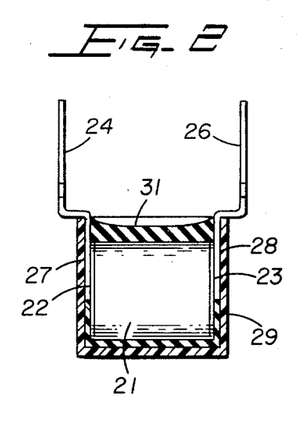
FIG. 2 is a cross-sectional view of the assembled boxed capacitor shown in FIG. 1.

Referring first to FIGS. 1 and 2 for a consideration of a boxed encapsulated capacitor that is to be fabricated by the method and apparatus of the present invention, there is shown a capacitor blank 21 which may be of the type shown in the afore-identified patent issued in the names of W. J. Fanning and O. T. Masopust, Jr.

This patent discloses a method of manufacturing small metallized film capacitor rolls wherein a pair of metallized films are laser scribed to define capacitor plate areas as the films are advanced and wound together with the metallized surface of each film abutting the non-metallized surface of the other film. It is to be understood that other metallized film or foil capacitors as well as other electrical components may also be assembled and boxed with the apparatus and method of the present invention.

After a capacitor roll is formed, it is flattened to assume the configuration shown in FIG. 1, and is provided with end electrodes 22 and 23 of heat fusible material. A pair of terminals or leads 24 and 26 are provided with enlarged portions 27 and 28 which are heat fused to the end electrodes 22 and 23, as shown in FIG. 2. The now complete capacitor is inserted in a small plastic box 29 and the box is then filled with a dielectric encapsulant 31, such as an epoxy resin.

Figure 3:
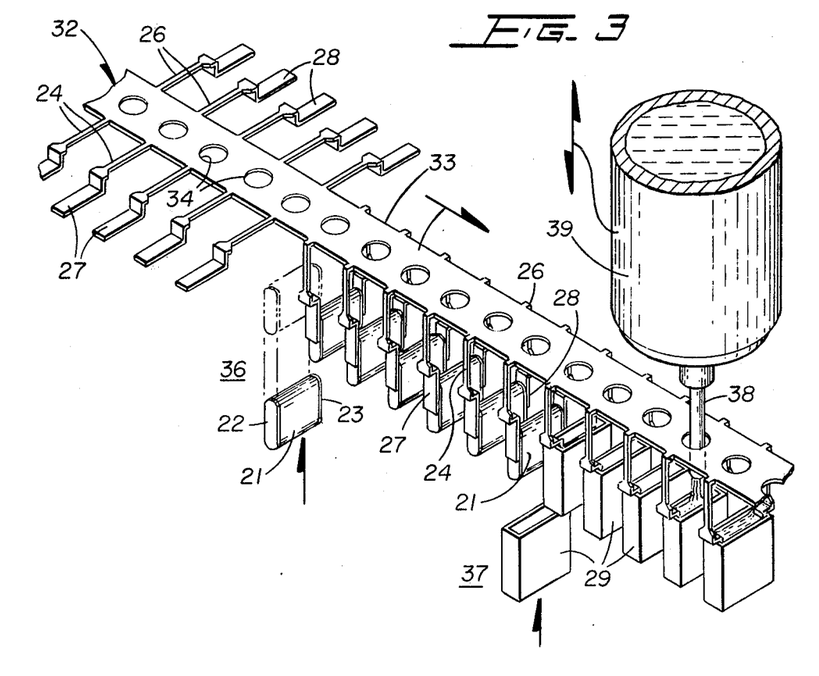
FIG. 3 is a perspective view of a lead frame that is advanced through a number of fabricating stations whereat the leads of the frame are bent, held and bonded to capacitor blanks, and the bonded capacitors blanks are subsequently boxed and encapsulated in a dielectric plastic.

The overall concepts utilized, in accordance with the present invention, to assemble the boxed capacitor are generally illustrated in FIG. 3. First, a lead frame strip generally designated by the reference numeral 32 is fabricated in a punch press to provide a central strip 33 having a succession of feed holes 34. The leads 24 and 26 are fabricated to extend in opposite directions from the strip 33, and each pair of leads is aligned with one of the feed holes 34. The lead frame strip may be constructed of phosphor bronze or other resilient metal having good electrical characteristics.

The lead frame strip 32 is intermittently advanced to position each pair of leads 24 and 26 in a capacitor assembly station depicted by the reference numeral 36 whereat capacitor blanks are moved into proximity to the strip 33, and then the leads 24 and 26 are bent to move the enlarged portions 27 and 28 into engagement with the end electrodes 22 and 23. Heat is applied to fuse the end electrodes to the bent-down enlarged portions 27 and 28 of the leads 24 and 26. Subsequent advance of the lead frame strip 32 moves each bonded capacitor into a box assembly station generally referenced by the numeral 37 whereat a plastic box 29 is pushed over the capacitor 21. This box is partially filled with encapsulant so as to partially submerge the capacitor 21.

Next, further advance of the lead frame strip 32 moves the boxed capacitor into alignment with a nozzle 38 of a plastic dispenser 39. The nozzle is movably mounted so as to be easily moved through an aligned feed hole to a position near the top of a box 29. A metered amount of encapsulant is passed through the nozzle to completely cover the boxed capacitor.

The strip 32 may be subsequently advanced to move a group of capacitors into a racking device of the type shown in copending application Ser. No. 72,372, filed Sept. 4, 1979, now U.S. Pat. No. 4,270,424, in the name of D. K. Sandmore. As described in that copending application, racks are loaded with sections of lead frame strips 32 and then transported to a curing oven for setting the encapsulant. In the alternative, the subsequent advance of the lead frame strip 32 may feed the boxed and encapsulated capacitors through an oven which acts to heat cure or set the encapsulant. Following heat setting of the encapsulant, the leads 24 and 26 may be severed from the central strip 33 leaving boxed capacitors with parallel extending leads 24 and 26 which may be inserted in holes formed in a printed circuit board.

Figure 4:
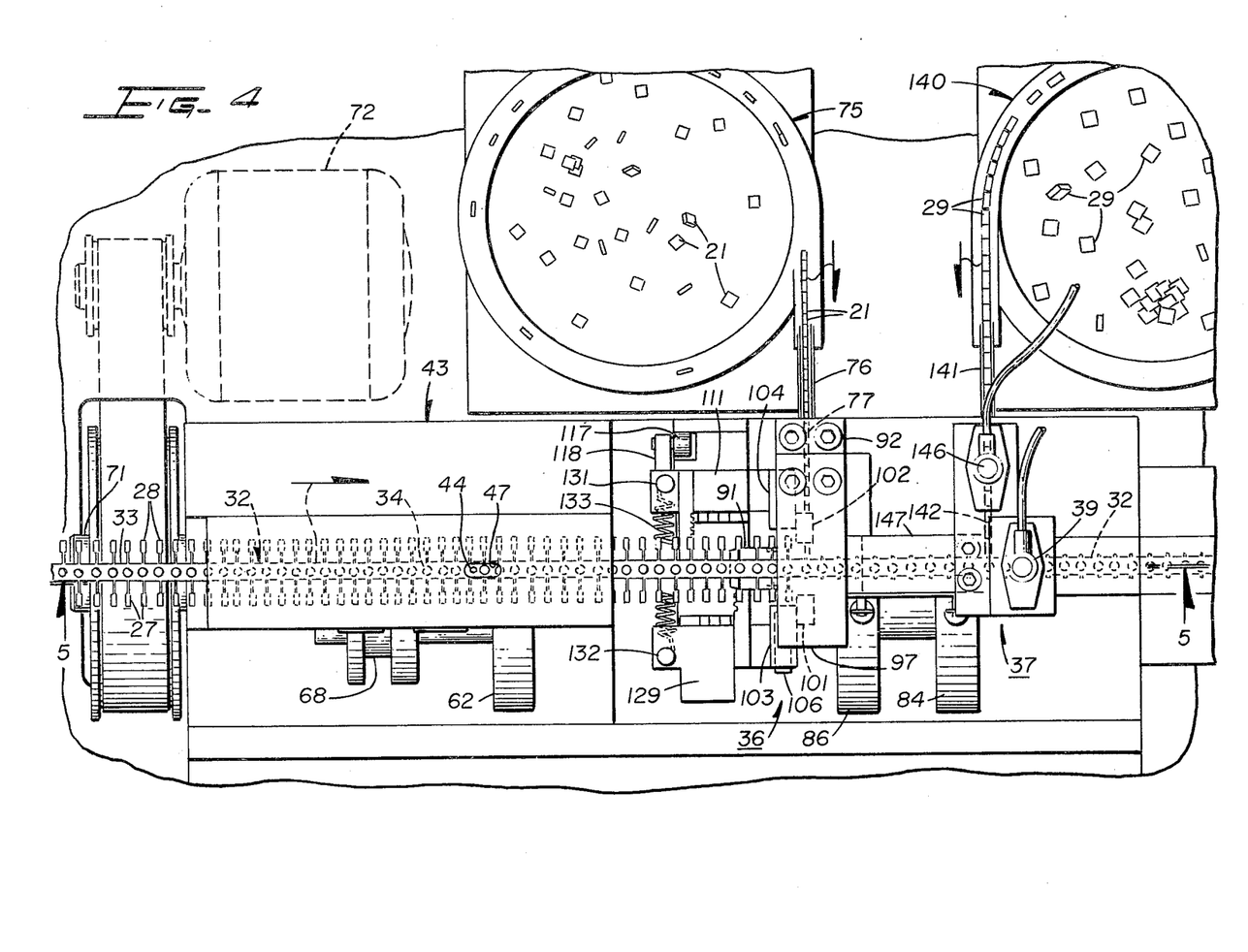
FIG. 4 is a top plan view of a multi-station apparatus for assembling boxed capacitors on a lead frame with a particular showing of the facilities for advancing capacitor blanks and dielectric boxes into assembly positions.
Figure 5:
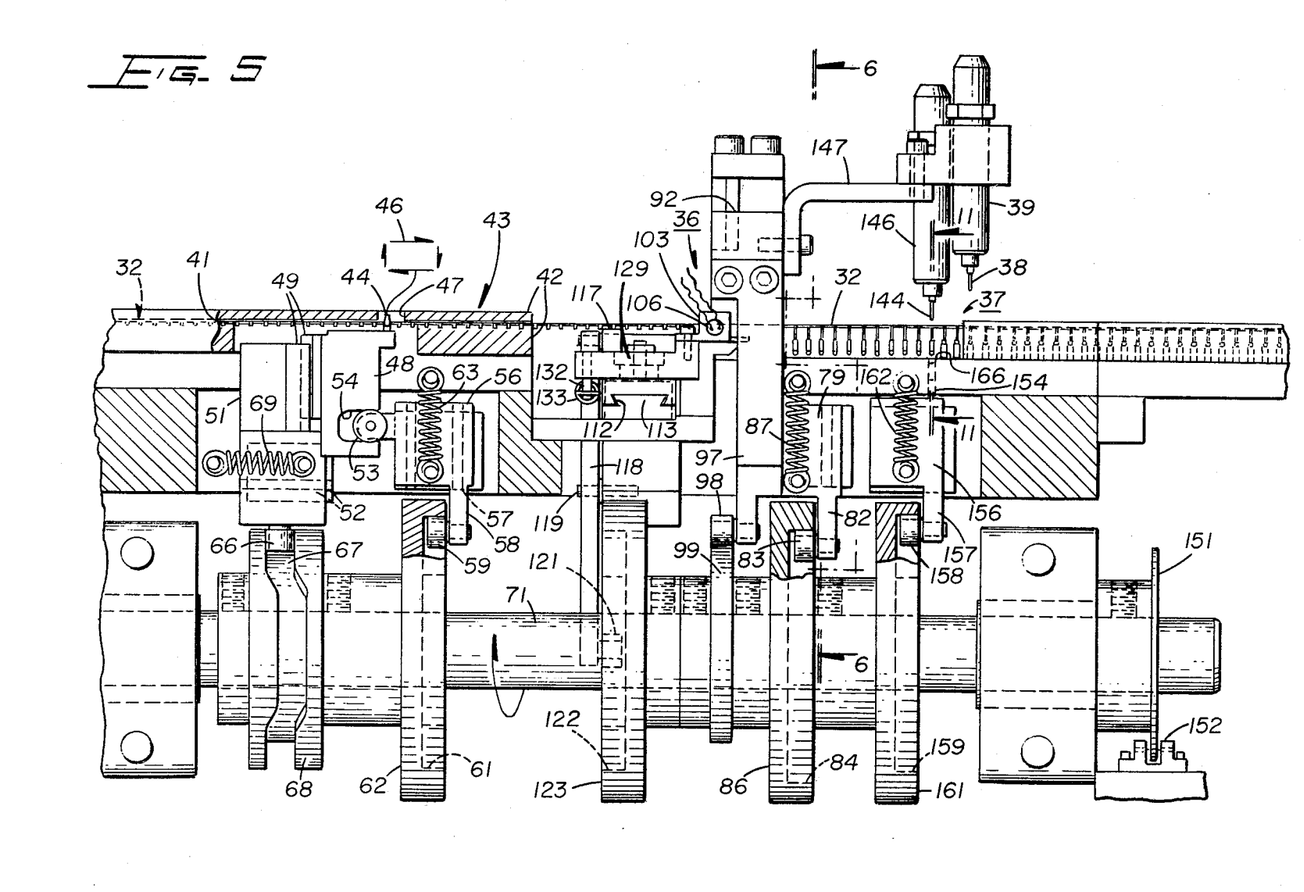
FIG. 5 is a side view partially cut away of the apparatus shown in FIG. 4 particularly denoting a series of cams for operating the various cooperating assembly mechanisms and the feed mechanism to advance the lead frame through the assembly positions to produce the boxed encapsulated capacitors.

Attention is directed to FIGS. 4 and 5 to initially consider the details of the mechanisms utilized to incrementally advance the lead frame strip 32 through the various assembly stations. The lead frame strip is incrementally moved from a storage reel (not shown) through a rectangular slot 41 formed by frame sections 42 of an overall apparatus housing 43. The incremental movement is imparted to the strip by a stub finger or pin 44 which executes a rectangular motion graphically depicted by the motion diagram 46, in a slot 47 formed in the upper frame section 42. The stub pin 44 is mounted on a first slide 48 which is mounted by gibs and ways 49 on a second slide 51 which, in turn, is mounted on gibs and ways 52. The slide 48 is moved in a vertical direction by a roller 53 riding in a slot 54 formed in the slide 48. Roller 53 is rotatably mounted on a third slide 56 that, in turn, is mounted by gibs and ways 57 to the housing 43. An arm 58 depending from the slide 56 provides a mounting for a cam follower 59 riding on a cam surface 61 formed in a face of a cam disc 62. A spring 63 urges the slide 56 and cam follower 59 upwardly so that the cam follower 59 rides on the cam surface 61.

Horizontal motion is imparted to the slide 48 by moving the slide 51 in a reciprocatory horizontal path. This motion path is accomplished by a cam follower 66 extending from the bottom of the slide 51 into a cam slot 67 formed in the periphery of a cam disc 68. A spring 69 urges the slide 51 toward the left and, hence, the cam follower 66 is urged to engage the left surface of the cam slot 67.

The cam discs 62 and 68 are mounted on a cam shaft 71 driven by a motor 72 (see FIG. 4). Rotation of the cam discs 62 and 68 cause the feed pin 44 to initially advance upwardly into an aligned feed hole 34 formed in the strip 32. Subsequent thereto the pin 44 moves toward the right to advance the strip an increment equal to the distance between the pair of adjacent feed holes 34. The pin 44 is then withdrawn vertically and moved leftward to the initial position in anticipation of the next cyclic advance to be imparted to the strip 32.

The strip 32 is incrementally moved into the capacitor assembly station 36. At this station, capacitor blanks 21 are fed by a conventional vibratory feed mechanism 75 into a downwardly inclined trackway 76 having an extension 77 formed in the housing 43, see FIG. 6. The vibratory forces urge the capacitor blanks 21 to move along the inclined trackway 76 and extension 77 into alignment with a pusher 78 attached to a slide 79 mounted by gibs and ways 80 to the housing 43. The upper end of the pusher is provided with a side slot 81 to receive the capacitor blank. The slide 79 is provided with a depending arm 82 for rotatably mounting a cam follower 83 which rides along a cam surface 84 formed in the side face of a cam disc 86 that is mounted on the cam shaft 71. A spring 87 urges the slide upwardly and, thus, forces the cam follower roller to ride along and follow the cam surface 84. An upward movement of the slide 79 advances the pusher 78 to move a capacitor blank into a spaced relation with the underside of the lead frame strip 32.

Figure 8:
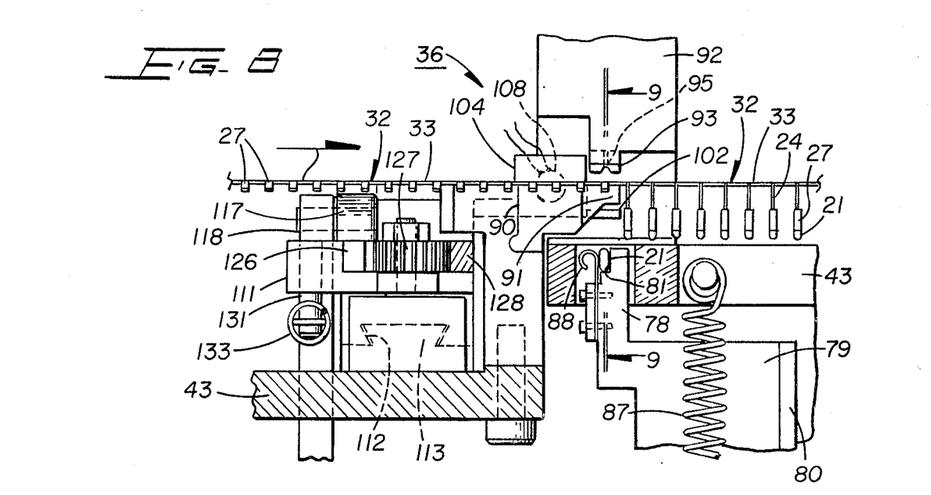
FIG. 8 is a cross-sectional view taken along line 8—8 of FIG. 7 particularly showing a portion of the mechanism for advancing capacitor blanks into a bonding position.
Figure 9:
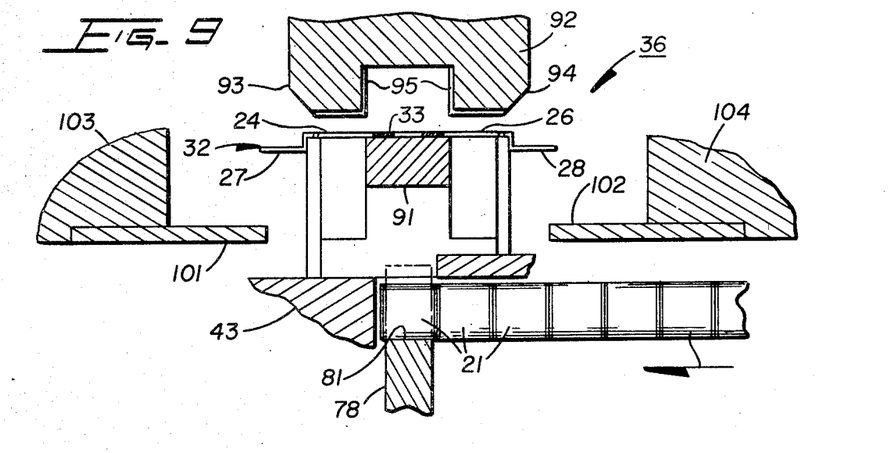
FIG. 9 is a cross-sectional view taken along lines 9—9 of FIG. 8 showing the lead bending and bonding facilities prior to operation.

The capacitor blank 21 is held in the side slot 81 of the pusher 78 by a spring retainer 88 as illustrated in FIG. 8. As a result of the upward positioning of the capacitor blank, the blank is positioned beneath an anvil 91, see FIGS. 6, 8, 9 and 10, over which the lead frame strip 32 is incrementally advanced. As illustrated in FIGS. 8 and 9, the anvil 91 is of rectangular cross section, and is constructed as a projection extending from a support 90 secured to the frame for the overall apparatus. The height of the anvil is selected to be slightly less than the lengths of the narrow sections of the leads 24 and 26.

Located above the anvil 91 is a lead forming ram 92 having a pair of projecting block-like bending elements 93 and 94 for engaging and bending leads 24 and 26 downwardly about the anvil 91 to move the wide, end sections 27 and 28 of the leads into engagement with the end electrodes 22 and 23 of the positioned capacitor 21. As will be noted from FIG. 9, the bending elements 93 and 94 are fabricated to straddle the anvil 91, and are constructed to project a distance slightly less than the length of the narrow sections of the leads 24 and 26. The inner facing surfaces of the bending elements are each provided with a flared mouth slot 95 to enable the descending bending elements to pick up and captivate the narrow sections of the leads 24 and 26 during a bending operation. The ram 92 is mounted by gibs and ways 96 to a portion of the frame housing 43. An actuator arm 97 is bolted to the ram 92 and is provided with a cam follower 98 that rides on the peripheral surface of a cam 99 which is also secured to the shaft 71.

Figure 10:
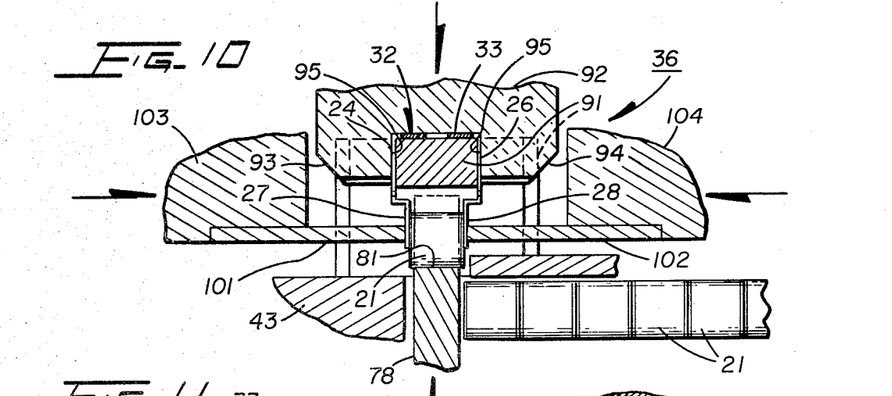
FIG. 10 is a cross-sectional view similar to FIG. 9 but showing the bending and bonding facilities in operative positions.

Upon each rotation of the cam 99, the ram 92 will move downwardly to bend the aligned leads 24 and 26 to position the wide sections 27 and 28 thereof below the anvil and in alignment with a pair of positioned capacitor electrodes 101 and 102. The wide sections 27 and 28, during initial punch press fabrication, are initially bent down slightly from the horizontal. Upon descent of the ram 92, these prebent sections are thus moved beneath the anvil so that the wide sections 27 and 28 are resiliently held against the end electrodes.

Figure 6:
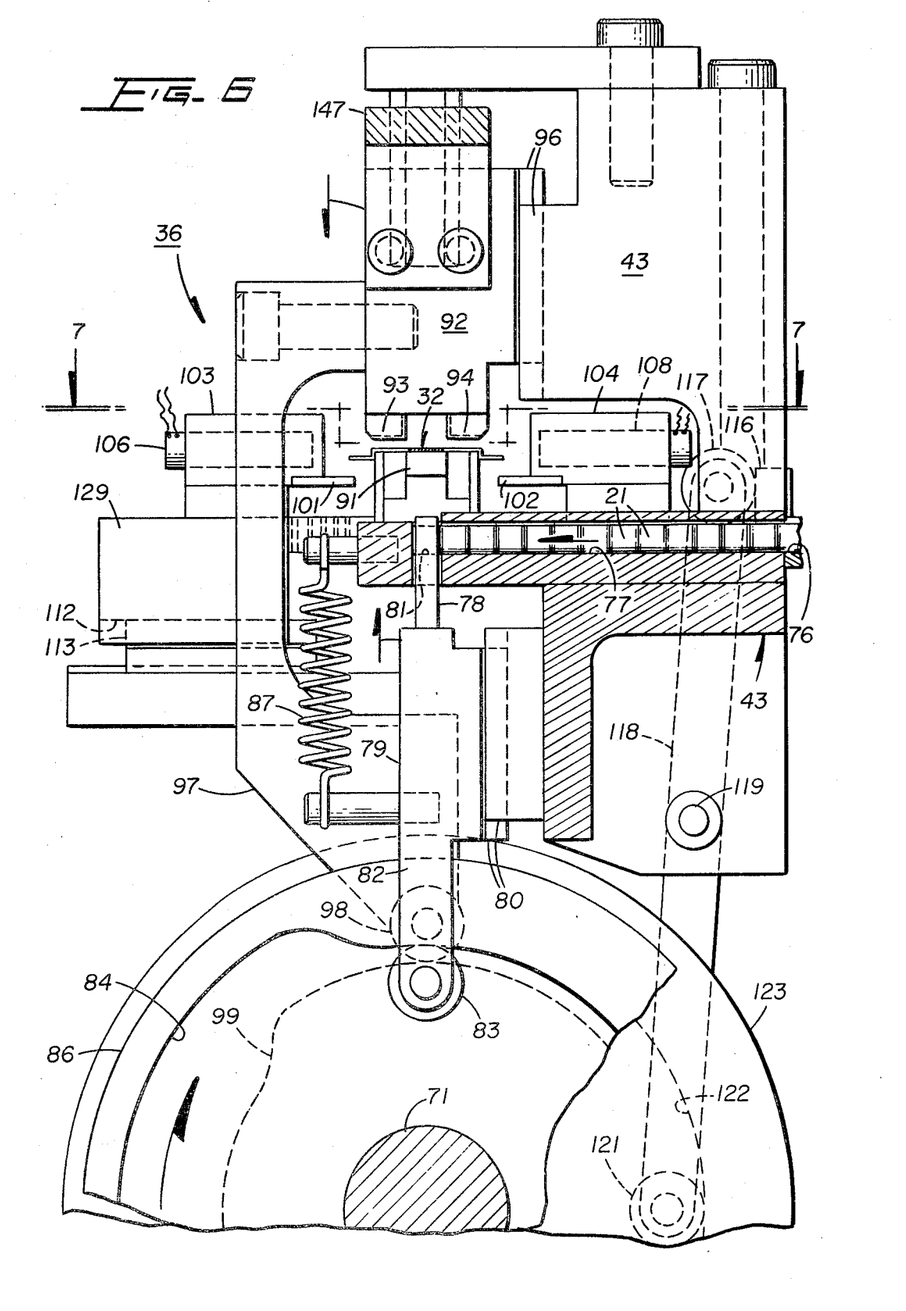
FIG. 6 is a sectional view taken along line 6—6 of FIG. 5 depicting the mechanism for bending and bonding the leads to the capacitor blanks together with a showing of the mechanism for advancing the capacitor blanks into the bonding position.
Figure 7:
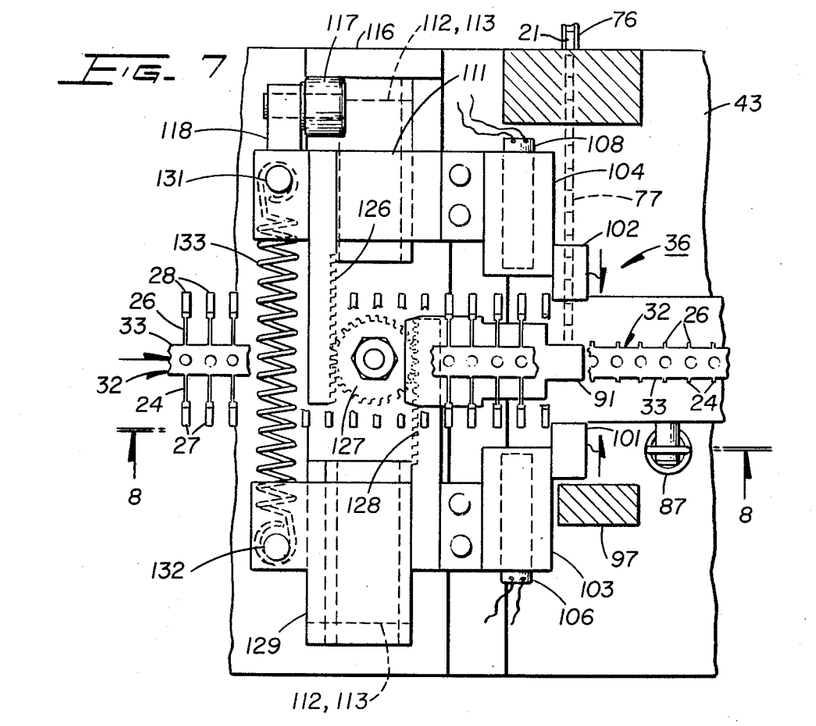
FIG. 7 is a top view taken along line 7—7 of FIG. 6, illustrating facilities for bonding the leads to the capacitors.

Attention is directed to FIGS. 6, 7 and 8 for a consideration of the mechanisms utilized to reciprocate the bonding electrodes 101 and 102 into and out of engagement with an aligned pair of leads which abut a capacitor blank. The bonding electrodes 101 and 102 are respectively secured to a pair of heat conducting blocks 103 and 104 containing resistance heat cartridges 106 and 108. The block 104 is secured to a slide 111 having a way 112 formed on the underside thereof to slidably fit on a gib 113. Secured to the rear end of the slide is a laterally projecting bar 116 against which bears an actuator roller 117 mounted on a lever 118 pivotally mounted on a stud shaft 119. The other end of the lever 118 provides a mounting for a cam follower 121 that bears against a cam surface 122 formed in the side face of a cam disc 123. Motion of the slide 111 is transmitted through a rack 126 to a pinion 127 which engages a rack 128 secured to a slide 129 on which the block 103 is mounted. The slide 129 is also provided with a way 112 on its underside to ride on the gib 113.

The slides 111 and 129 are provided with pin extensions 131 and 132 that are interconnected by a tension spring 133 so that the slides 111 and 129 are urged toward each other but are held in a separated position by the roller 117 bearing against the bar 116 of the slide 111. Rotation of the cam disc 123 causes the cam follower 121 to pivot about shaft 119 to move the roller 117 away from or against the bar 116. When the roller 117 is pivoted to move away from the bar 116, the tension spring is relieved to urge the bar 116 to follow the roller 117 and allow the slide 111 to move the rack 128, whereupon the slide 129 will move toward the slide 111. When the slides 111 and 129 move toward each other, the heater blocks 103 and 104 (see FIGS. 9, 10 and 11) and the electrodes 101 and 102 will move toward each other. The electrodes 101 and 102 will accordingly engage the wide portions 27 and 28 of the positioned leads 24 and 26, thereby applying heat through the leads to the capacitor end electrodes 22 and 23 which, in effect, will fuse the end electrodes to the wide portions 27 and 28 of the leads. It will be noted that while the electrodes 101 and 102 are approaching the leads, the bending elements 93 and 94 are still positioned to hold the wide portions of the leads against the end electrodes to insure a good fusing action.

Figure 11:
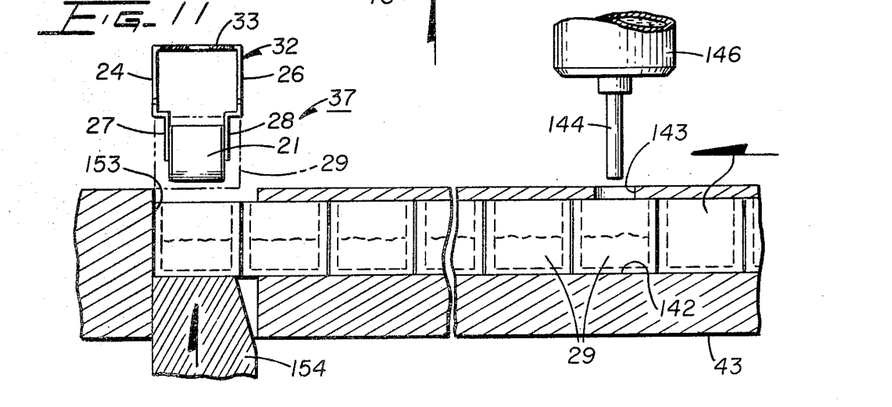
FIG. 11 is a cross-sectional view taken along lines 11—11 of FIG. 5 showing the facilities for pushing the boxes onto the capacitor blanks, and the facilities for flowing metered amounts of encapsulant into the boxes.

Subsequent advance of the lead frame strip 32 moves the bonded capacitor into the box assembly and encapsulation station 37 (see FIGS. 4 and 11). Small plastic boxes 29 are advanced from a commercial vibratory feed hopper 140 along a downwardly inclined trackway 141 into a passageway 142 formed by frame elements of the housing 43, see FIG. 11. Each box is advanced into registration with an aperture 143 formed in the housing and positioned in alignment with a reciprocating nozzle 144 of a commercial encapsulant dispenser 146. A suitable dispenser of this type may be purchased from Electron Fusion Device Inc., East Providence, R.I.

Referring to FIG. 5, it will be noted that the nozzle 144 and the dispenser 146 are mounted on a bracket 147 secured to the ram 92 which operates the lead bending and fusing devices so that each downward movement of the ram to effectuate a bending of a pair of leads is accompanied by a downward movement of the nozzle into proximity of an open top of a box 29. Attached to the shaft 71 is a disc 151 having a slot therein which is moved into registration with a pair of elements of a photodetector 152. Each time the photodetector 152 is energized by passage of light through the slot in disc 151, a signal is generated to operate the dispenser 146 to meter a precise amount of encapsulant through the nozzle 144. The dispensing of the encapsulant occurs at the time the nozzle is moved down and aligned with the aperture 143. The nozzle directs the metered amount of encapsulant through the aperture into the aligned box 29 to partially fill the box.

The procession of boxes emanating from the elevated vibratory hopper 140 are moved along the passageway 142 and urged against a stop wall 153 (see FIG. 11) forming part of the framework of the housing 43. As a leading box 29 abuts the wall 153, it will ride over the forward end of a pusher blade plate 154. Pusher plate 154 is mounted on a slide 156, see FIG. 5, that has an extension 157 for rotatably supporting a cam follower 158 that rides on a cam surface 159 formed in the side face of a cam disc 161 secured to the shaft 71. A tension spring 162 normally urges the slide 156 upwardly to hold the cam follower 158 against the cam surface 159.

Rotation of the cam disc 161 causes the cam surface to react against the cam follower 158 to move the slide 156 and, hence, the pusher plate 154 upwardly and downwardly. In the down position, the top surface of the pusher plate 154 normally acts as an extension of the bottom surface of the passageway 142. The movement of the pusher plate 154 in an upwardly direction causes a leading box 29 to be advanced over an indexed capacitor 21 that is secured to the leads 24 and 26. The capacitor blank 21 will be immersed in the encapsulant but not completely submerged therein. The pusher blade plate 154 is held in the upward position during a subsequent indexing of the lead frame strip 32 so that the box is moved along with the capacitor and is supported on guideway surface 166 (see FIG. 5) forming part of the frame housing.

The boxes 29 are pushed along the guideway 166 by the capacitors depending from the advancing lead frame strip so that each box is positioned in alignment with the nozzle 38 of the encapsulant dispenser 39. Encapsulant dispenser 39 is also secured to the bracket 147 and, hence, the ram 92, so that upon each reciprocation of the ram 92, the nozzle 38 moves downwardly. The nozzle 38 is aligned with a feed hole 34 in the strip 32 so that the nozzle can pass through the strip into close proximity to the open top of the aligned box 29.

As the slot in the disc 151 (see FIG. 5) attached to the shaft 71 moves past the photodetector 152 in the disc, the signal that is generated is also utilized to actuate the dispenser 38 to dispense a metered amount of encapsulant into the aligned box 29. This added metered amount is selected to be sufficient to completely submerge the capacitor 21 without overflowing the top of the box.

Figure 12:
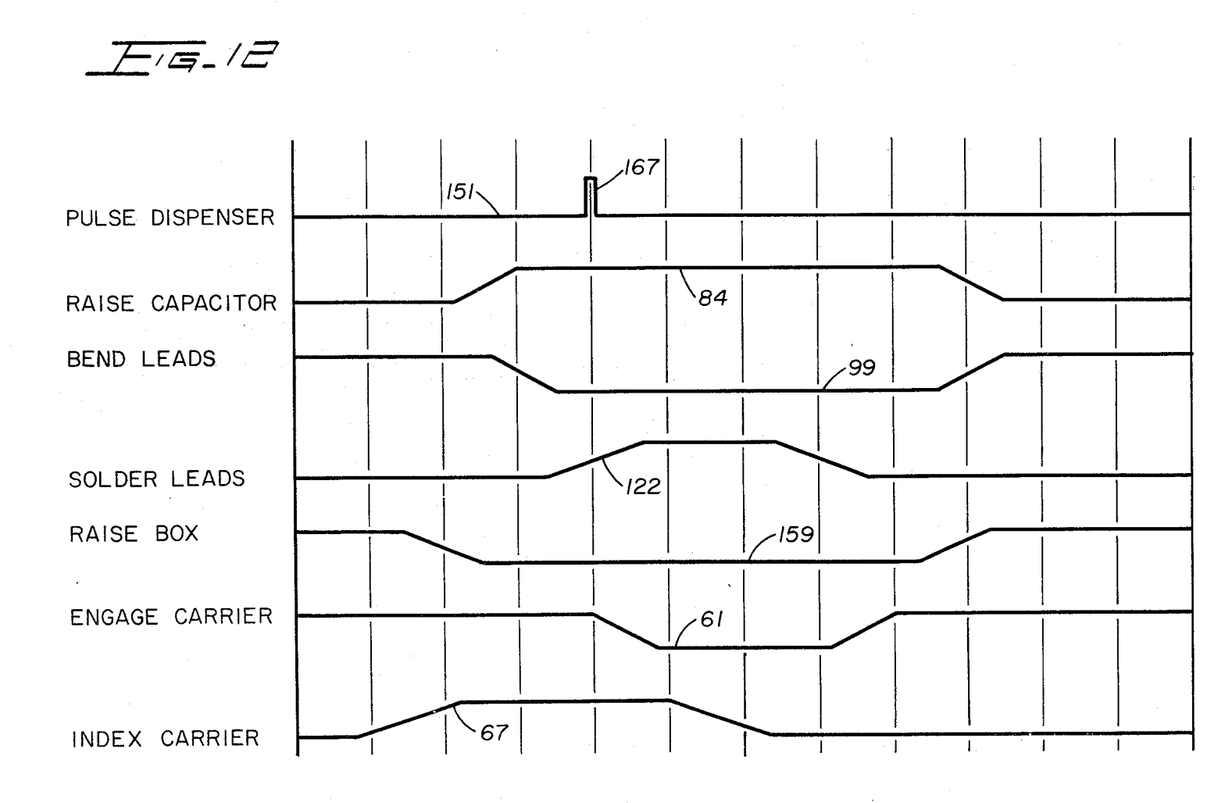
FIG. 12 is a timing diagram illustrating the relative times of operation of the various component mechanisms.

The relative sequence of operation between the various mechanisms may be also appreciated by considering the timing chart shown in FIG. 12, which depicts a representation of the contours of the cams 61, 67, 84, 99, 122 and 159 and the slotted control discs 151.

Briefly recapitulating, in the operation of the overall apparatus the cam surfaces 61 and 67 are effective to move the lead frame feed pin 44 through a rectangular motion to engage and advance the lead frame strip 32. The high portion of the illustrated cam contour 67 depicts the rest period of the indexing mechanism, and it is during this period of time that the other cams are rendered effective to perform the designated controls of the assembly mechanisms.

More specifically, during this period the contoured cam 84 is effective to raise a capacitor blank 21 into position to have the leads bonded thereto. Following the raising of the capacitor, the cam 99 is effective to move the ram 92 downwardly to advance the bending elements 93 and 94 into position to bend the leads 24 and 26 and, thus, force the wide sections thereof 27 and 28 into engagement with the end electrodes 22 and 23 of the capacitor blank. Immediately thereafter, the cam surface 122 is effective to move the bonding electrodes 101 and 102 into engagement with the wide portions 27 and 28 of the bent leads 24 and 26 and apply heat to the end electrodes causing a fusion of the end electrodes with the wide portions of the leads.

During the time that the lead frame strip 32 is being indexed, the cam surface 159 is effective to start the upward movement of the pusher 154 to start the upward movement of a box 29 toward a positioned capacitor 21. After the index of the carrier frame strip, the cam 159 is effective to further move the pusher 154 to advance a box partially filled with encapsulant over the positioned capacitor 21. The pip signal 167 on timing line 151 indicates a passage of a slot between the elements of the photodetector 152. It will be recalled that at this time the dispensers 39 and 146 are moved into the downward position by the downward movement of the ram 92. The pip signal is effective to control the encapsulant dispensers 39 and 146 to dispense metered amounts of encapsulant to initially, partially fill a box 29 and then substantially, completely fill the box.

The assembled boxes and capacitors are advanced along guideway surface 166 in a subsequent processing unit, which may be an oven for curing the encapsulant. In the alternative, the lead frame strip 32 may be severed and the severed sections with the depending capacitors and boxes may be advanced into a magazining facility of the type shown in the afore-identified application filed in the name of D. K. Sandmore.

What is claimed is:

1. An apparatus for assembling leads to a capacitor blank wherein the capacitor blank is constructed of a rolled metallized film having a pair of end electrodes constructed of heat fusible material, which comprises:
    an anvil;
    means for cyclically advancing a lead frame having a central strip and oppositely extending leads over said anvil;
    means rendered effective upon each advance of the lead frame for advancing a capacitor blank into proximity to the underside of the anvil;
    means rendered effective upon each advance of a capacitor blank into proximity of the anvil for bending a pair of leads about said anvil and into engagement with the pair of end electrodes; and
    heat means rendered effective following bending of said pair of leads for fusing the leads to the end electrodes.

2. An apparatus as defined in claim 1, wherein said heat means comprises:
    a pair of electrodes;
    a pair of slides supporting said electrodes for movement toward and away from each other, each of said slides having a rack secured thereto in facing relation;
    a gear interposed between and engaging said racks; and
    means for moving one of said racks to move a first of said electrodes toward a first of the bent leads, while motion is transmitted through said gear to move the other electrode toward the second of said bent leads.

3. An apparatus for assembling a capacitor having a pair of heat fusible end electrodes to a pair of leads extending laterally from a lead frame strip, each of said leads having a narrow section extending from the strip to a wider end section, which comprises:
 an anvil having a height which is less than the length of the narrow sections of the leads;
 means for advancing the lead frame strip over the anvil;
 a bending die assembly having a pair of spaced bending elements mounted for movement toward the anvil die to move past and straddle the anvil die while bending the leads;
 means for positioning a capacitor beneath the anvil die with the end electrodes positioned to be engaged by the wide section of the leads bent by the die assembly;
 means for moving the die assembly to descend the bending elements to bend the leads down about the anvil to move the wide end sections of the leads into engagement with the end electrodes;
 a pair of heating electrodes mounted for movement toward each other to engage the wide sections of the bent leads; and
 means rendered effective after descent of the die assembly for moving the heating electrodes toward each other to engage and bond the wide end sections of leads to the end electrodes of the capacitor.

4. An apparatus as set forth in claim 3, wherein the inner facing surfaces of the bending elements are each provided with a flared mouth slot for captivating and receiving the narrow sections of the leads.

5. An apparatus for bonding leads to an electrical device wherein the electrical device has a pair of end electrodes constructed of heat fusible material, which comprises:
 an anvil;
 means for cyclically advancing a lead frame having a central strip and oppositely extending leads along and over said anvil;
 means rendered effective upon an advance of the lead frame for positioning an electrical device in proximity to the underside of the anvil;
 means rendered effective upon the advance of the electrical device into proximity to the underside of the anvil for bending the pair of leads about said anvil and into engagement with the pair of end electrodes;
 a pair of bonding electrodes; and
 means rendered effective upon the bending of the leads for moving the bonding electrodes into engagement with the bent leads to bond the leads to the end electrodes.

6. An apparatus as set forth in claim 5, wherein said bending means comprise:
 a ram having a pair of projecting block-like elements spaced apart a distance sufficient to straddle the anvil; and
 means for moving the ram to advance the block-like elements to straddle the anvil while bending the leads to engage the pair of end electrodes.

7. An apparatus as set forth in claim 6, wherein inner facing surfaces of said block-like members are each provided with a flared mouth slot to enable the bending elements to pick up and captivate the leads during the bending of the leads.

* * * * *